United States Patent
Campbell et al.

(10) Patent No.: US 10,557,939 B2
(45) Date of Patent: Feb. 11, 2020

(54) LIDAR SYSTEM WITH IMPROVED SIGNAL-TO-NOISE RATIO IN THE PRESENCE OF SOLAR BACKGROUND NOISE

(71) Applicant: Luminar Technologies, Inc., Portola Valley, CA (US)

(72) Inventors: Scott R. Campbell, Sanford, FL (US); Jason M. Eichenholz, Orlando, FL (US); Matthew D. Weed, Winter Park, FL (US)

(73) Assignee: Luminar Technologies, Inc., Orlando, FL (US)

( * ) Notice: Subject to any disclaimer, the term of this patent is extended or adjusted under 35 U.S.C. 154(b) by 655 days.

(21) Appl. No.: 15/296,881

(22) Filed: Oct. 18, 2016

(65) Prior Publication Data

US 2018/0231659 A1    Aug. 16, 2018

Related U.S. Application Data

(60) Provisional application No. 62/243,633, filed on Oct. 19, 2015.

(51) Int. Cl.
| | | |
|---|---|---|
| *G01S 17/10* | (2006.01) | |
| *G01S 17/88* | (2006.01) | |
| *G01S 7/487* | (2006.01) | |
| *G01S 7/481* | (2006.01) | |
| *G01S 17/08* | (2006.01) | |
| *G01S 7/497* | (2006.01) | |

(52) U.S. Cl.
CPC .......... *G01S 17/102* (2013.01); *G01S 7/4814* (2013.01); *G01S 7/4815* (2013.01); *G01S 7/4816* (2013.01); *G01S 7/4876* (2013.01); *G01S 7/497* (2013.01); *G01S 17/08* (2013.01); *G01S 17/88* (2013.01)

(58) Field of Classification Search
CPC .. G01S 17/08; G01S 157/4814; G01S 7/4815; G01S 7/4876; G01S 157/497; G01S 17/102; G01S 17/88; G01S 7/4816
USPC ....................................................... 356/5.01
See application file for complete search history.

(56) References Cited

U.S. PATENT DOCUMENTS

| | | | |
|---|---|---|---|
| 5,198,657 A | 3/1993 | Trost et al. | |
| 5,696,778 A | 12/1997 | MacPherson | |
| 5,867,305 A | 2/1999 | Waarts et al. | |
| 5,872,621 A | 2/1999 | Wilkerson et al. | |
| 5,892,575 A | 4/1999 | Marino | |

(Continued)

FOREIGN PATENT DOCUMENTS

WO    WO-8601295 A1 *    2/1986    ......... G01N 21/3518

OTHER PUBLICATIONS

U.S. Appl. No. 15/180,580, filed Jun. 13, 2016, Hall.
Search Report and Written Opinion dated Apr. 4, 2017 in PCT Application No. PCT/US2016/064020.

*Primary Examiner* — Daniel L Murphy

(57) ABSTRACT

A lidar system with improved signal-to-noise ratio in the presence of solar background noise. The lidar system can comprise a light source to emit light toward a target. The light source can have an operating wavelength which lies within a band that delineates a relative maximum in atmospheric absorption. The lidar system can also include a detector to detect scattered light from the target and a processor to determine a characteristic of the target based on a characteristic of the scattered light received at the detector.

28 Claims, 10 Drawing Sheets

(56) References Cited

U.S. PATENT DOCUMENTS

| | | | |
|---|---|---|---|
| 6,388,789 B1 * | 5/2002 | Bernstein | B81B 3/0021 359/198.1 |
| 6,449,384 B2 | 9/2002 | Laumeyer et al. | |
| 6,710,324 B2 | 3/2004 | Hipp | |
| 6,723,975 B2 | 4/2004 | Saccomanno | |
| 6,747,747 B2 | 6/2004 | Hipp | |
| 6,759,649 B2 | 7/2004 | Hipp | |
| 7,092,548 B2 | 8/2006 | Laumeyer et al. | |
| 7,209,221 B2 | 4/2007 | Breed et al. | |
| 7,323,670 B2 * | 1/2008 | Walsh | G01C 15/002 250/205 |
| 7,345,271 B2 | 3/2008 | Boehlau et al. | |
| 7,443,903 B2 | 10/2008 | Leonardo et al. | |
| 7,532,311 B2 | 5/2009 | Henderson et al. | |
| 7,570,793 B2 | 8/2009 | Lages et al. | |
| 7,583,364 B1 | 9/2009 | Mayor et al. | |
| 7,649,920 B2 | 1/2010 | Welford | |
| 7,652,752 B2 | 1/2010 | Fetzer et al. | |
| 7,872,794 B1 | 1/2011 | Minelly et al. | |
| 7,902,570 B2 | 3/2011 | Itzler et al. | |
| 7,945,408 B2 | 5/2011 | Dimsdale et al. | |
| 7,969,558 B2 | 6/2011 | Hall | |
| 7,995,796 B2 | 8/2011 | Retterath et al. | |
| 8,059,263 B2 | 11/2011 | Haberer et al. | |
| 8,072,663 B2 | 12/2011 | O'Neill et al. | |
| 8,081,301 B2 | 12/2011 | Stann et al. | |
| 8,138,849 B2 | 3/2012 | West et al. | |
| 8,279,420 B2 | 10/2012 | Ludwig et al. | |
| 8,280,623 B2 | 10/2012 | Trepagnier et al. | |
| 8,346,480 B2 | 1/2013 | Trepagnier et al. | |
| 8,364,334 B2 | 1/2013 | Au et al. | |
| 8,452,561 B2 | 5/2013 | Dimsdale et al. | |
| 8,541,744 B1 | 9/2013 | Liu | |
| 8,548,014 B2 | 10/2013 | Fermann et al. | |
| 8,625,080 B2 | 1/2014 | Heizman et al. | |
| 8,675,181 B2 | 3/2014 | Hall | |
| 8,723,955 B2 | 5/2014 | Klehn et al. | |
| 8,767,190 B2 | 7/2014 | Hall | |
| 8,796,605 B2 | 8/2014 | Mordarski et al. | |
| 8,804,787 B1 | 8/2014 | Coleman et al. | |
| 8,836,922 B1 | 9/2014 | Pennecot et al. | |
| 8,880,296 B2 | 11/2014 | Breed | |
| 8,896,818 B2 | 11/2014 | Walsh et al. | |
| 8,934,509 B2 | 1/2015 | Savage-Leuchs et al. | |
| 9,000,347 B2 | 4/2015 | Woodward et al. | |
| 9,041,136 B2 | 5/2015 | Chia | |
| 9,048,370 B1 | 6/2015 | Urmson et al. | |
| 9,063,549 B1 | 6/2015 | Pennecot et al. | |
| 9,069,060 B1 | 6/2015 | Zbrozek et al. | |
| 9,074,878 B2 | 7/2015 | Steffey et al. | |
| 9,086,273 B1 | 7/2015 | Gruver et al. | |
| 9,086,481 B1 | 7/2015 | Dowdall et al. | |
| 9,091,754 B2 | 7/2015 | d'Aligny | |
| 9,103,669 B2 | 8/2015 | Giacotto et al. | |
| 9,121,703 B1 | 9/2015 | Droz et al. | |
| 9,160,140 B2 | 10/2015 | Gusev et al. | |
| 9,170,333 B2 | 10/2015 | Mheen et al. | |
| 9,199,641 B2 | 12/2015 | Ferguson et al. | |
| 9,213,085 B2 | 12/2015 | Kanter | |
| 9,239,260 B2 | 1/2016 | Bayha et al. | |
| 9,246,041 B1 | 1/2016 | Clausen et al. | |
| 9,285,464 B2 | 3/2016 | Pennecot et al. | |
| 9,285,477 B1 | 3/2016 | Smith et al. | |
| 9,297,901 B2 | 3/2016 | Bayha et al. | |
| 9,299,731 B1 | 3/2016 | Lenius et al. | |
| 9,304,154 B1 | 4/2016 | Droz et al. | |
| 9,304,203 B1 | 4/2016 | Droz et al. | |
| 9,304,316 B2 | 4/2016 | Weiss et al. | |
| 9,310,471 B2 | 4/2016 | Sayyah et al. | |
| 9,335,255 B2 | 5/2016 | Retterath et al. | |
| 9,360,554 B2 | 6/2016 | Retterath et al. | |
| 9,368,933 B1 | 6/2016 | Nijjar et al. | |
| 9,383,201 B2 | 7/2016 | Jachman et al. | |
| 9,383,445 B2 | 7/2016 | Lu et al. | |
| 2002/0041435 A1 | 4/2002 | Krummrich | |
| 2002/0060784 A1 | 5/2002 | Pack et al. | |
| 2003/0043058 A1 | 3/2003 | Jamieson et al. | |
| 2005/0214690 A1 | 9/2005 | Verheijden et al. | |
| 2006/0231771 A1 | 10/2006 | Lee et al. | |
| 2006/0290920 A1 | 12/2006 | Kämpchen et al. | |
| 2007/0040121 A1 | 2/2007 | Kalayeh | |
| 2007/0182949 A1 | 8/2007 | Niclass | |
| 2008/0027591 A1 | 1/2008 | Lenser et al. | |
| 2008/0074640 A1 | 3/2008 | Walsh et al. | |
| 2008/0181266 A1 | 7/2008 | Deladurantaye et al. | |
| 2009/0122295 A1 | 5/2009 | Eaton | |
| 2009/0262760 A1 | 10/2009 | Krupkin et al. | |
| 2009/0273770 A1 | 11/2009 | Bauhahn et al. | |
| 2010/0034221 A1 | 2/2010 | Dragic | |
| 2010/0128744 A1 | 5/2010 | Deladurantaye et al. | |
| 2011/0085149 A1 | 4/2011 | Nathan | |
| 2011/0101239 A1 * | 5/2011 | Woodhouse | G01S 7/4802 250/458.1 |
| 2012/0168605 A1 | 7/2012 | Milanovic | |
| 2012/0206712 A1 | 8/2012 | Chang et al. | |
| 2012/0227263 A1 | 9/2012 | Leclair et al. | |
| 2012/0268105 A1 | 10/2012 | Mann et al. | |
| 2013/0010820 A1 | 1/2013 | Curtis | |
| 2013/0027708 A1 * | 1/2013 | Foltynowicz | G02F 1/39 356/437 |
| 2013/0033742 A1 | 2/2013 | Rogers et al. | |
| 2013/0282208 A1 | 10/2013 | Mendez-Rodriguez et al. | |
| 2014/0111805 A1 | 4/2014 | Albert et al. | |
| 2014/0146303 A1 | 5/2014 | Mitchell et al. | |
| 2014/0168631 A1 | 6/2014 | Haslim et al. | |
| 2014/0176933 A1 | 6/2014 | Haslim et al. | |
| 2014/0211194 A1 | 7/2014 | Pacala et al. | |
| 2014/0268098 A1 | 9/2014 | Schwartz | |
| 2014/0268311 A1 | 9/2014 | Zhu | |
| 2014/0293263 A1 | 10/2014 | Justice et al. | |
| 2014/0293266 A1 | 10/2014 | Hsu et al. | |
| 2014/0330479 A1 | 11/2014 | Dolgov | |
| 2014/0376001 A1 | 12/2014 | Swanson | |
| 2015/0109605 A1 | 4/2015 | Major, Jr. et al. | |
| 2015/0131080 A1 | 5/2015 | Retterath et al. | |
| 2015/0177368 A1 | 6/2015 | Bayha et al. | |
| 2015/0185244 A1 | 7/2015 | Inoue et al. | |
| 2015/0185313 A1 | 7/2015 | Zhu | |
| 2015/0192676 A1 | 7/2015 | Kotelnikov et al. | |
| 2015/0192677 A1 | 7/2015 | Yu et al. | |
| 2015/0204978 A1 | 7/2015 | Hammes et al. | |
| 2015/0214690 A1 | 7/2015 | Savage-Leuchs et al. | |
| 2015/0301182 A1 | 10/2015 | Geiger et al. | |
| 2015/0316415 A1 | 11/2015 | Islam | |
| 2015/0323654 A1 | 11/2015 | Jachmann et al. | |
| 2015/0378023 A1 | 12/2015 | Royo et al. | |
| 2015/0378241 A1 | 12/2015 | Eldada | |
| 2016/0025842 A1 | 1/2016 | Anderson et al. | |
| 2016/0047901 A1 | 2/2016 | Pacala et al. | |
| 2016/0049765 A1 | 2/2016 | Eldada | |
| 2016/0146939 A1 | 5/2016 | Shpunt et al. | |
| 2016/0146940 A1 | 5/2016 | Koehler | |
| 2016/0161600 A1 | 6/2016 | Eldada et al. | |
| 2016/0245919 A1 | 8/2016 | Kalscheur et al. | |

* cited by examiner

| | 905nm | 1060nm | 1410nm | 1430nm | 1550nm |
|---|---|---|---|---|---|
| Dry | 0.73 | 0.62 | 0.03 | 0.05 | 0.25 |
| Humid | 0.60 | 0.62 | 0.00 | 0.01 | 0.25 |

Solar Irradiance at Sea Level (W·m$^{-2}$·nm$^{-1}$)

| | 905nm | 1060nm | 1410nm | 1430nm | 1550nm |
|---|---|---|---|---|---|
| Dry | 5.0 E-5 | 1.0 E-8 | 5.0 E-3 | 7.3 E-5 | 6.5 E-7 |
| Humid | 1.5 E-4 | 1.0 E-7 | 1.4 E-2 | 1.4 E-3 | 1.0 E-6 |

Absorption Coefficient (cm$^{-1}$)

FIG. 9

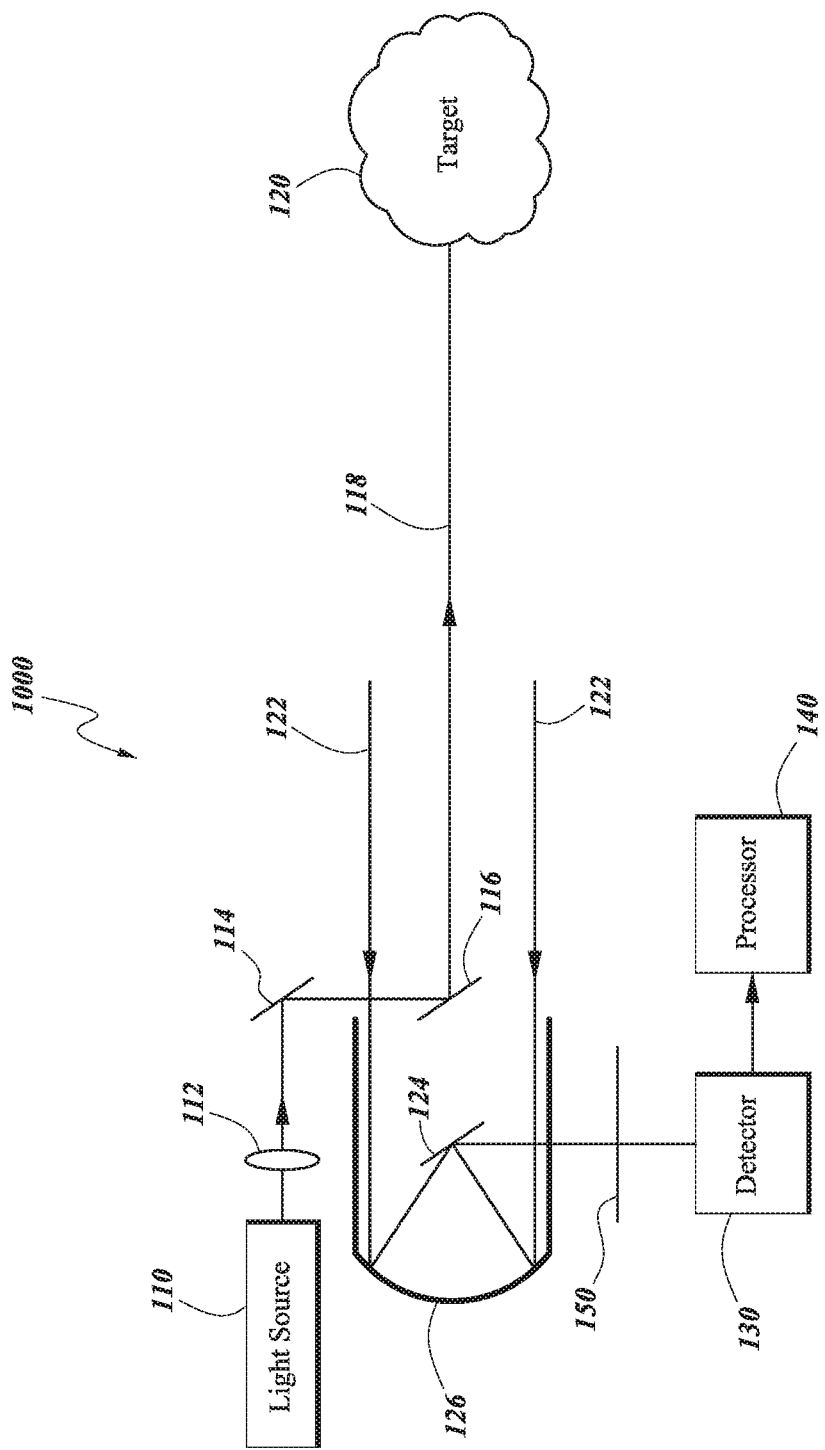

LIDAR SYSTEM WITH IMPROVED SIGNAL-TO-NOISE RATIO IN THE PRESENCE OF SOLAR BACKGROUND NOISE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application claims priority to U.S. Provisional Patent Application No. 62/243,633, filed Oct. 19, 2015, and entitled "LIDAR SYSTEM WITH IMPROVED SIGNAL-TO-NOISE RATIO IN THE PRESENCE OF SOLAR BACKGROUND NOISE," the entirety of which is hereby incorporated by reference herein.

BACKGROUND

Field

This disclosure relates to lidar systems. More particularly, this disclosure relates to lidar systems having improved signal-to-noise ratio in the presence of solar background noise.

Description of the Related Art

Lidar is a technology that can be used to measure distances to remote targets. Typically, a lidar system includes a light source and a detector. The light source can be, for example, a laser which emits light having a particular operating wavelength. The light source emits light toward a target which then scatters the light. Some of the scattered light is received back at the detector. The system determines the distance to the target based on one or more characteristics associated with the returned light. For example, the system may determine the distance to the target based on the time of flight of a returned light pulse.

The operating wavelength of a lidar system may lie, for example, in the infrared, visible, or ultraviolet portions of the electromagnetic spectrum. The sun also produces light in these wavelength ranges. Therefore, light from the sun can act as background noise which can obscure signal light detected by the lidar system. This solar background noise can result in false-positive detections or can otherwise corrupt measurements of lidar systems.

SUMMARY

In some embodiments, a lidar system comprises: a light source to emit light toward a target, the light source having an operating wavelength which lies within a band that delineates a relative maximum in atmospheric absorption; a detector to detect scattered light from the target; and a processor to determine a characteristic of the target based on a characteristic of the scattered light received at the detector.

In some embodiments, the operating wavelength of the light source lies within a water absorption band of the atmosphere. In some embodiments, the operating wavelength of the light source is between about 930 nm and about 980 nm. In some embodiments, the operating wavelength of the light source is between about 1110 nm and about 1165 nm. In some embodiments, the operating wavelength of the light source is between about 1340 nm and about 1460 nm. In some embodiments, the operating wavelength of the light source is about 1430 nm. In some embodiments, the operating wavelength of the light source lies within an oxygen absorption band of the atmosphere.

In some embodiments, the light source is configured to switch between emitting light at the operating wavelength and emitting light at a wavelength that has a reduced absorption, wherein the reduced-absorption wavelength corresponds to an atmospheric absorption value that is less than or equal to one-half of the relative maximum in atmospheric absorption.

In some embodiments, a method comprises by a light source of a lidar system, emitting light toward a target, wherein the light source has an operating wavelength which lies within a band that delineates a relative maximum in atmospheric absorption; by a detector of the lidar system, detecting scattered light from the target; and by a processor of the lidar system, determining a characteristic of the target based on a characteristic of the scattered light received at the detector.

BRIEF DESCRIPTION OF THE DRAWINGS

FIG. 9 is a table which shows solar irradiance and absorption coefficients for selected wavelengths.

FIG. 10 is a schematic illustration of an example lidar system 1000 with improved signal-to-noise ratio in the presence of solar radiation.

DETAILED DESCRIPTION

Figure 1:
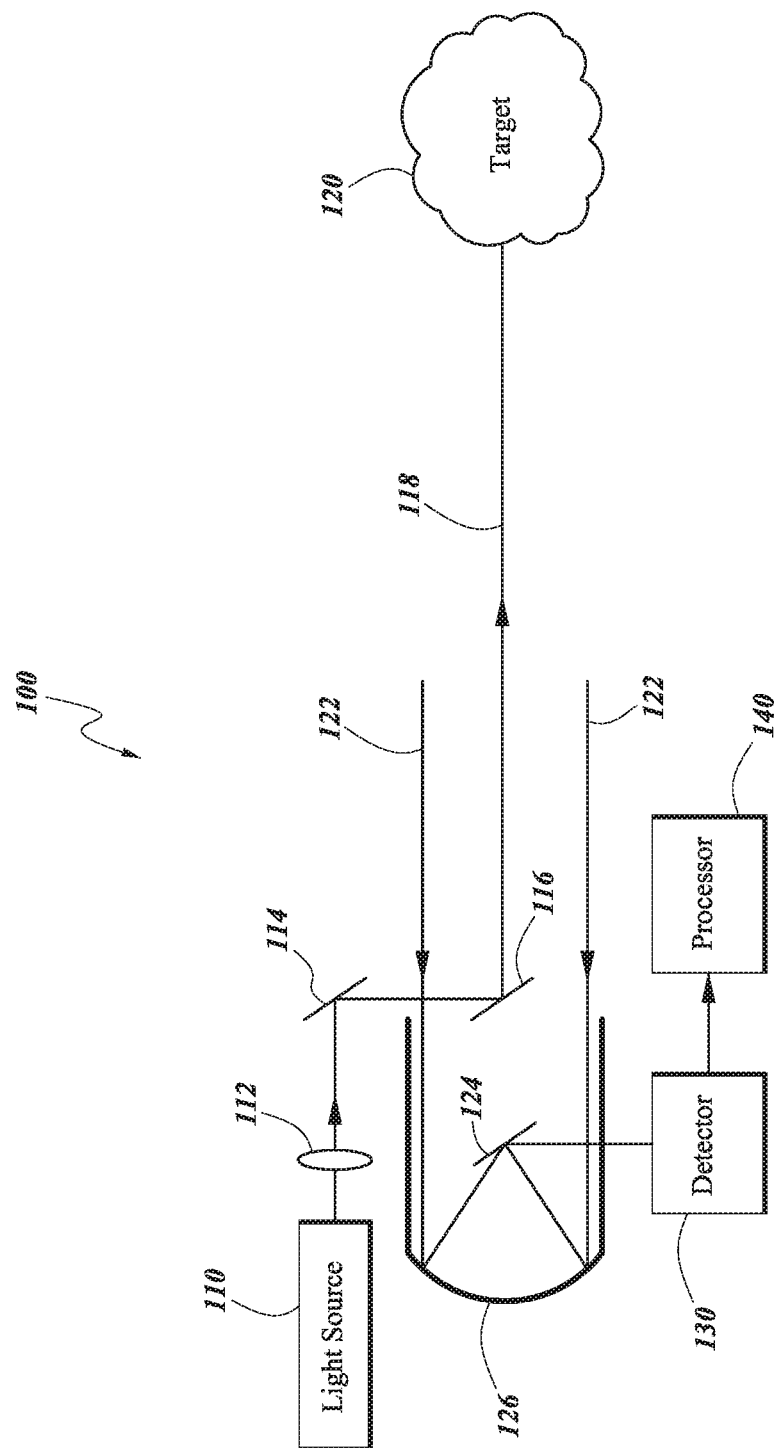
FIG. 1 is a schematic illustration of an example lidar system 100.

FIG. 1 is a schematic illustration of an example lidar system 100. The lidar system 100 includes a light source 110. The light source 110 can be, for example, a laser which emits light having a particular operating wavelength. The light source 110 emits an output beam of light 118 which is directed downrange toward a remote target 120. The output beam of light 118 can be continuous-wave, pulsed, or modulated in any way desired for a given application.

The lidar system 100 can optionally include one or more optical components to condition the output beam 118. These can include, for example, a beam expander lens 112 to expand the output beam 118 to a desired diameter. The lidar system 100 can also include one or more mirrors to direct the output beam 118 along a desired path. For example, a first mirror 114 directs the output beam 118 towards a second mirror 116. In some embodiments, the first and/or second mirrors 114, 116 are scanning mirrors which can steer the output beam 118 in one or more directions downrange. The scanning mirror(s) 114, 116 can be communicatively coupled to a processor 140 which can control the scanning mirror(s) so as to guide the output beam 118 in a desired direction downrange or along a desired scan path. In some embodiments, the scanning mirror(s) 114, 116 may include a galvanometer scanner, a resonant scanner, a piezoelectric actuator, a polygonal scanner, a rotating-prism scanner, a voice coil motor, a DC motor, a stepper motor, or a micro-electromechanical systems (MEMS) scanning device.

Once the output beam 118 reaches the downrange target 120, the target scatters light from the output beam 118. Some of the scattered light returns toward the lidar system 100. The scattered light is represented in FIG. 1 by input beam 122. The lidar system 100 can include a receiver 126 to receive the input beam 122 scattered from the target 120. In some embodiments, the receiver 126 can be a telescope. The input beam 122 enters the telescope 126 and is reflected by an optical surface toward a mirror 124, which then guides the input beam to a detector 130.

In some embodiments, the detector 130 is a single-photon avalanche diode (SPAD) detector, though other types of detectors can also be used. The detector 130 receives photons from the input beam 122 and generates one or more representative signals. For example, the detector 130 can generate an electrical signal that is representative of the input beam 122. This electrical signal can be fed into a processor 140. The processor 140 can include, for example, analog-to-digital conversion, sampling, and conditioning functions. In addition, the processor 140 can analyze one or more characteristics of the signal from the detector 130 to determine one or more characteristics of the target 120, such as its distance downrange from the lidar system 100. This can be done by, for example, analyzing the time of flight or phase modulation for a beam of light 118 transmitted by the light source 110. It should be understood, however, that the processor 140 can carry out any detection algorithm known in the field of lidar remote sensing or related fields.

Lidar systems such as the one shown in FIG. 1 are very useful and valuable tools. However, as is the case with any tool, they are not without potential weaknesses. One potential weakness of some lidar systems relates to background noise from the Sun's radiation. Another potential weakness of some lidar systems relates to absorption of certain wavelengths of light by the Earth's atmosphere. These potential weaknesses are discussed with respect to FIG. 2.

Figure 2:
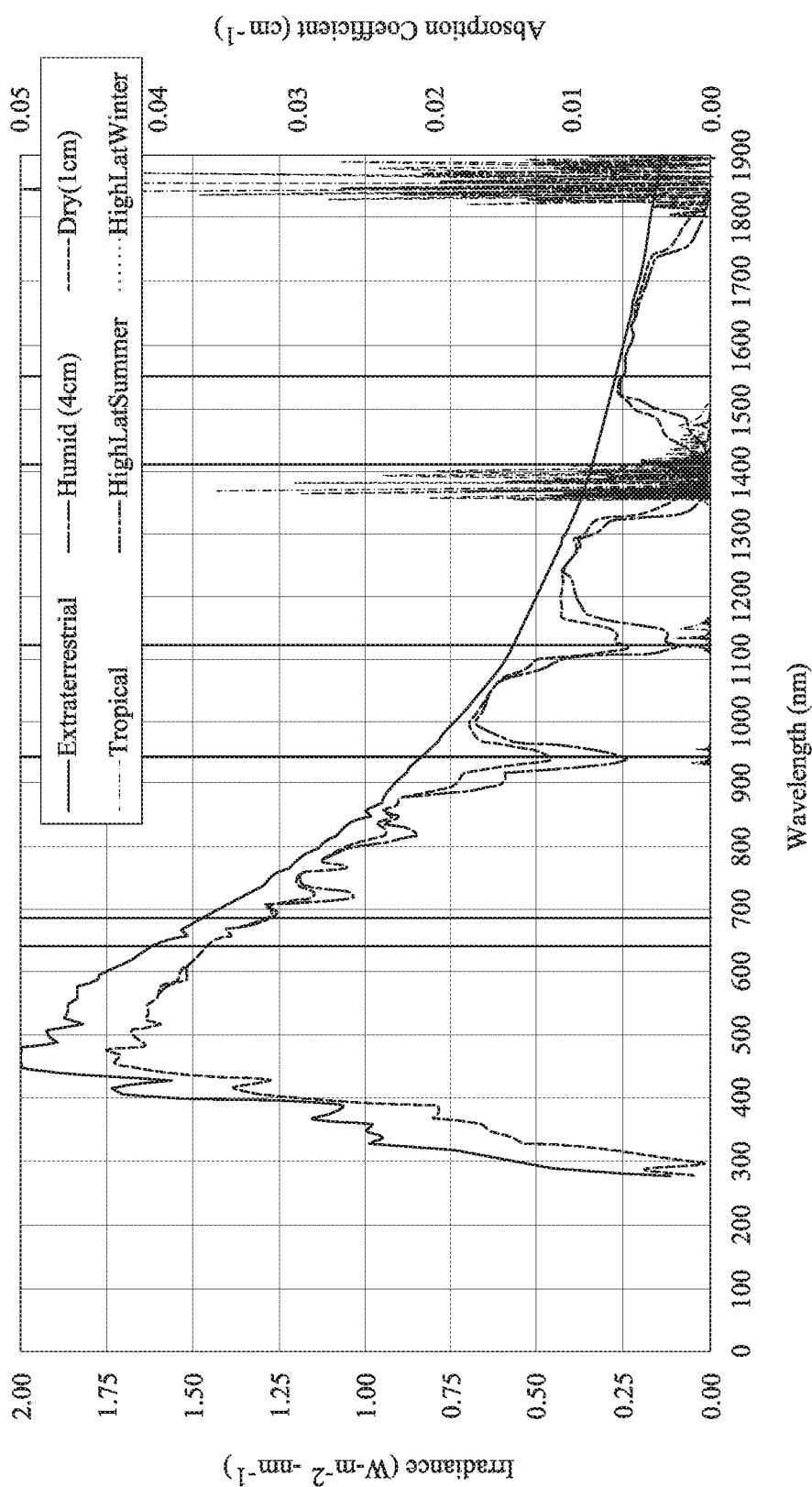
FIG. 2 is a graph which shows both the spectral irradiance of the Sun and the absorption coefficient of the Earth's atmosphere as a function of wavelength under various conditions.

FIG. 2 is a graph which shows both the spectral irradiance of the Sun and the absorption coefficient of the Earth's atmosphere as a function of wavelength under various conditions. As shown in FIG. 2, the Sun's irradiance rises sharply at around 300 nm and peaks between 400 and 500 nm. The irradiance then tapers off for infrared wavelengths. Thus, solar radiation stretches from around 300 nm to 1800 nm and beyond. Lidar systems often operate in this same range of wavelengths.

Lidar systems which operate in the presence of solar radiation can be prone to false-positives while attempting to accurately detect a remote target. This can be true, for example, of lidar systems with SPAD detectors, which are capable of relatively high sensitivities. These and other detectors used by lidar systems can be sensitive to wavelengths of light that are present in the spectral radiance from the sun, such as wavelengths in the ultraviolet, visible, and infrared portions of the electromagnetic spectrum. As such, light from the sun can be mistaken for scattered light from a downrange target. Sunlight can therefore result in false-positives.

The light from the sun which passes through the Earth's atmosphere and reaches a terrestrial-based lidar system can establish a background noise floor. Generally speaking, in order for a signal from the lidar system to be detectable, it must rise above the noise floor from background solar radiation. Although the signal-to-noise ratio of a lidar system can be increased by raising the power level of the beam transmitted by the light source, this is not always a readily-available option. For example, increased transmit power levels can result in the lidar system not being eye-safe, which can be disadvantageous or not permitted at all in some applications.

Besides showing the spectral irradiance from the Sun, FIG. 2 also shows the absorption coefficients of the Earth's atmosphere as a function of wavelength. Atmospheric absorption is evident from several relative minimums in the spectral irradiance curve. The atmospheric absorption coefficients are also graphed in FIG. 2. As shown, there are relative maximums in absorption at the same wavelengths where there are relative minimums in irradiance. The spectral irradiance is reduced for certain wavelengths because of absorption by water vapor, oxygen, or other atmospheric constituents. The depth of each relative minimum in the spectral irradiance curve depends on the magnitude of absorption at the corresponding wavelengths. Although the atmospheric absorption can vary somewhat depending upon location and conditions (e.g., tropical vs. high latitude, humid vs. dry, etc.), as shown in FIG. 2, there are prominent absorption bands at around 940 nm, 1125 nm, and 1400 nm. This is shown in additional detail in FIG. 3.

Figure 3:
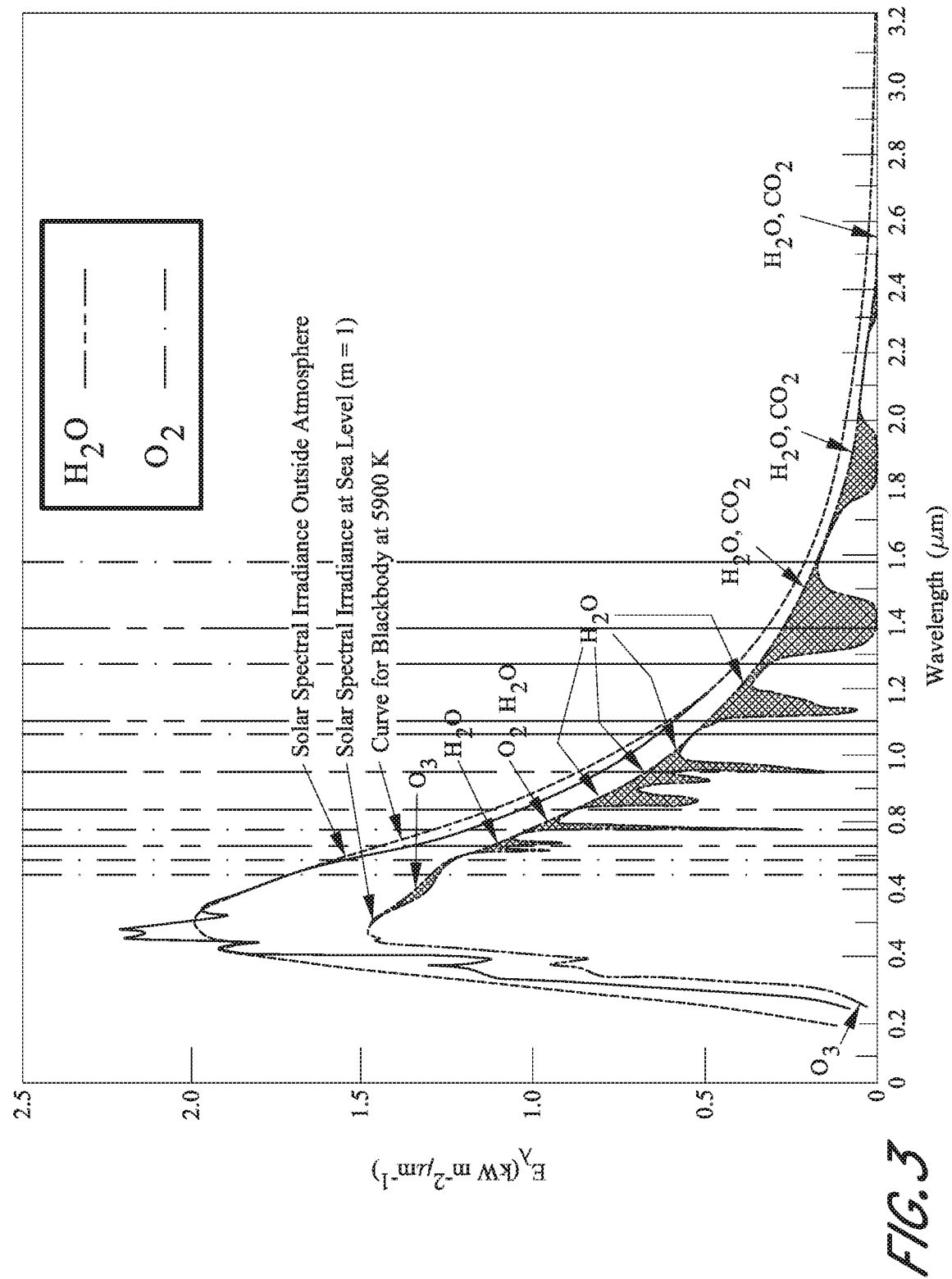
FIG. 3 is a graph which shows atmospheric absorption (shaded areas) in solar radiation.

FIG. 3 is a graph which shows atmospheric absorption (shaded areas) in solar radiation. As was the case with FIG. 2, FIG. 3 shows solar irradiance. However, FIG. 3 includes shaded regions which indicate atmospheric absorption. FIG. 3 also includes vertical lines (dashed and dash-dot line styles) which indicate whether atmospheric absorption at a particular wavelength is primarily due to water or oxygen, respectively.

Lidar systems are often used to analyze targets that are a kilometer or more downrange. Because of strong atmospheric absorption, certain operating wavelengths of light are avoided in these lidar systems. This is because if such lidar systems were to operate at wavelengths where strong atmospheric absorption exists, then the signal-to-noise ratio would disadvantageously suffer.

Although atmospheric absorption has long been considered to place design restrictions on the operating wavelengths of lidar systems, this potential problem can be leveraged to help solve the other potential problem referenced above: background noise due to solar radiation. This is particularly true for lidar systems with relatively short operating ranges, such as an operating range of 1 km or less, or more particularly 100 m or less. In some embodiments, lidar systems are intentionally designed to operate at a wavelength where relatively strong atmospheric absorption occurs. Because of relatively strong atmospheric absorption at such wavelengths, the level of the noise floor due to background solar radiation is lowered. Although the output beam of light from lidar systems operating at such wavelengths will also be absorbed to some degree by the atmosphere, the degree of absorption of the signal light from the lidar system is less than the degree of absorption of the solar radiation noise because light from the sun travels a far greater distance through the atmosphere than light from the lidar system. Again, this is particularly true for lidar systems with operating ranges of less than 1 km, and even more so for systems operating at ranges less than 100 m.

Figure 4:
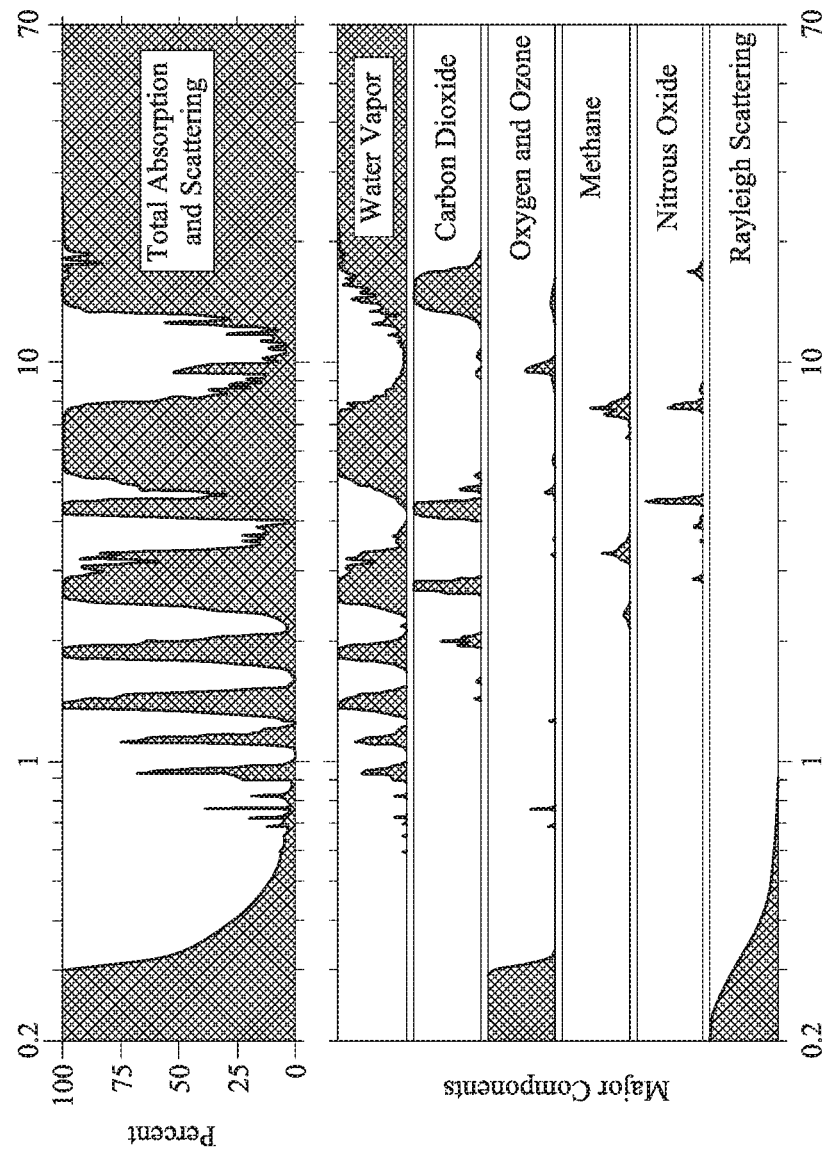
FIG. 4 illustrates absorption of solar radiation due to various atmospheric constituents and effects as a function of wavelength.

FIG. 4 illustrates absorption of solar radiation due to various atmospheric constituents and effects as a function of wavelength. As shown in FIG. 4, there are several wavelengths at which solar radiation is attenuated. For example, there are wavelengths where absorption of solar radiation is greater than 50%, greater than 75%, greater than 90%, greater than 95%, or greater than 99%. This attenuation can be due to combinations of absorption by water vapor, carbon dioxide, oxygen, ozone, methane, and/or nitrous oxide, as well as Rayleigh scattering. As discussed herein, the noise floor due to solar radiation can advantageously be reduced for a lidar system with an operating wavelength that falls within a band of relatively strong attenuation by the atmosphere.

Figure 5:
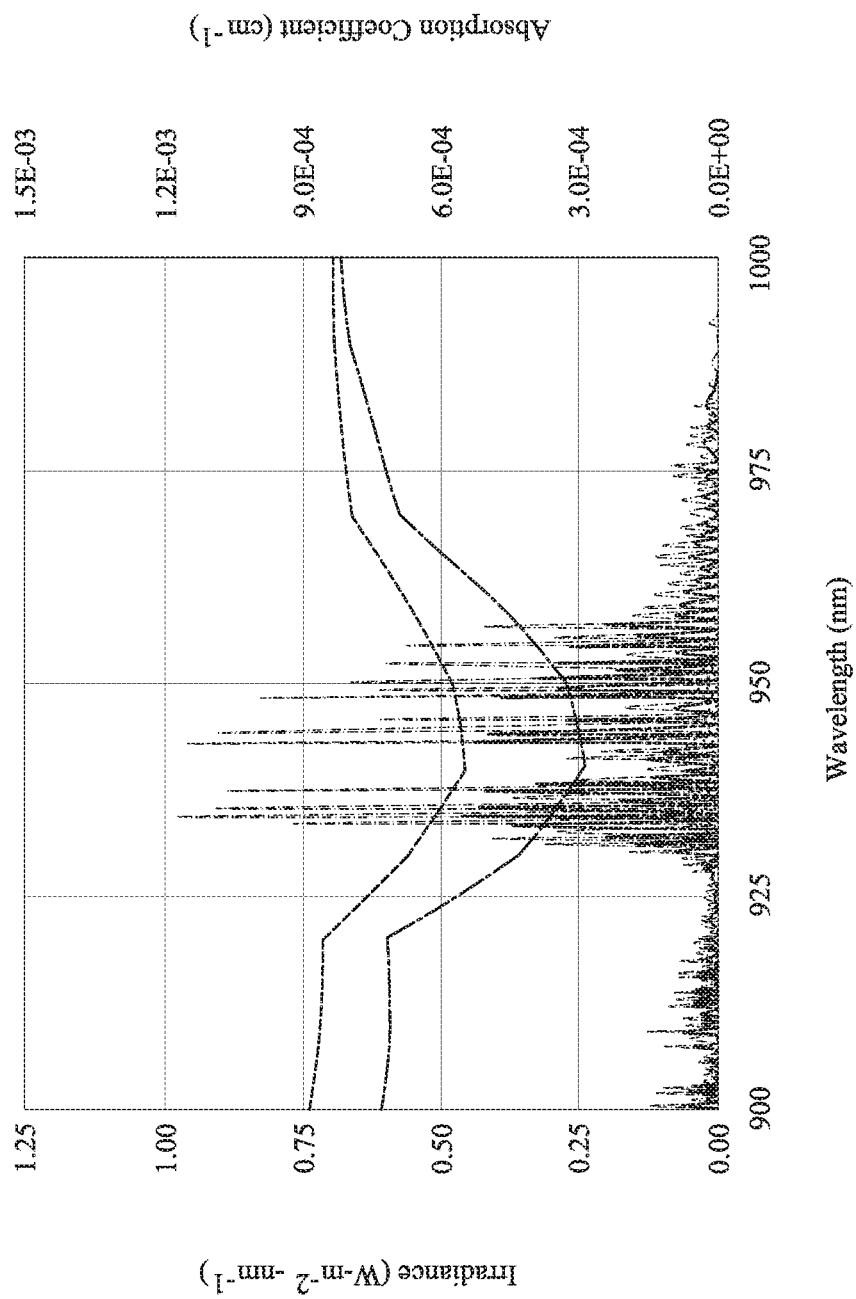
FIG. 5 is a graph which shows a magnified view of the spectral irradiance of the Sun and the absorption coefficient of the Earth's atmosphere from 900 nm to 1000 nm.

FIG. 5 is a graph which shows a magnified view of the spectral irradiance of the Sun and the absorption coefficient of the Earth's atmosphere from 900 nm to 1000 nm. As shown in the graph, there is a relative maximum in atmospheric absorption from about 925 nm to about 980 nm, and more specifically from about 930 nm to about 955 nm. These wavelengths would therefore be candidates for the operating wavelength of a lidar system according to the improved embodiments discussed herein.

Figure 6:
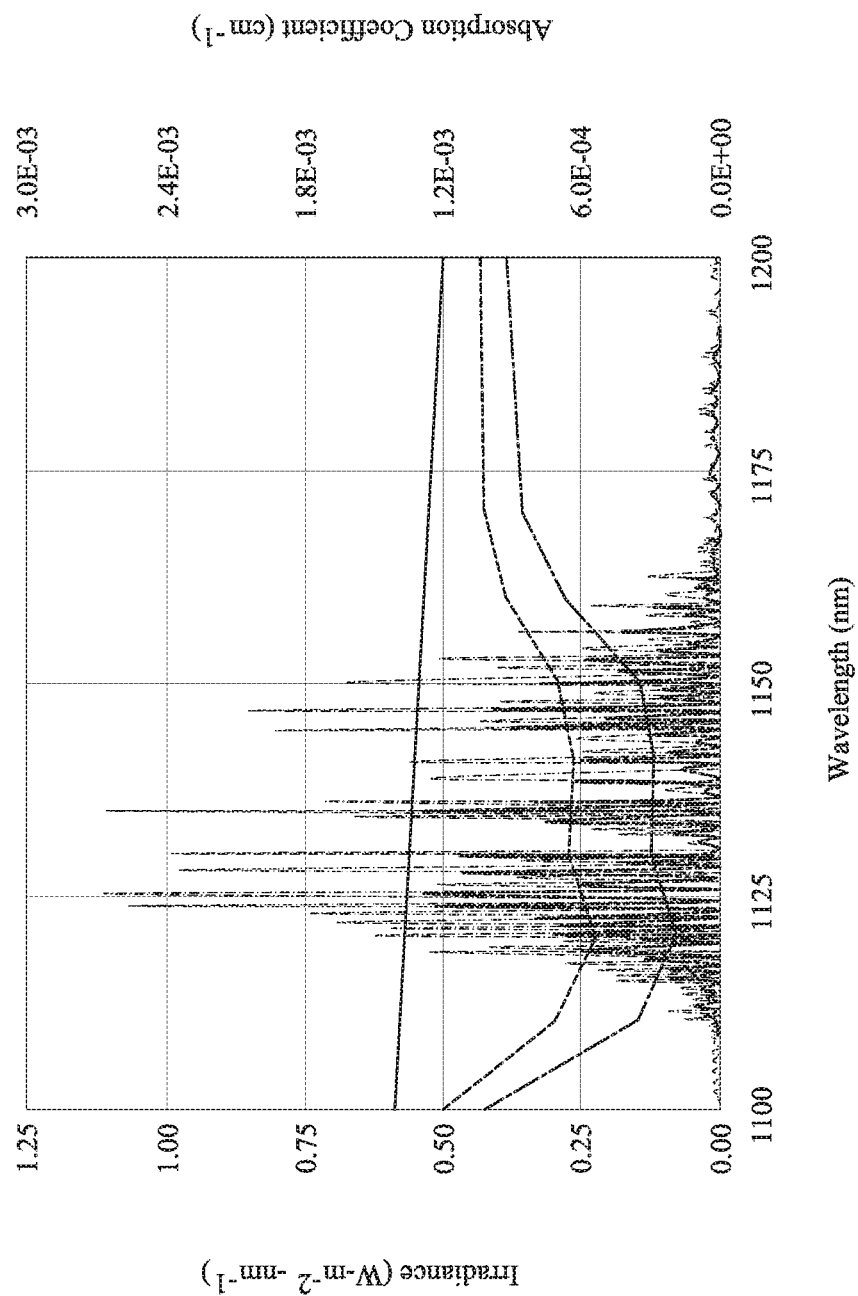
FIG. 6 is a graph which shows a magnified view of the spectral irradiance of the Sun and the absorption coefficient of the Earth's atmosphere from 1100 nm to 1200 nm.

FIG. 6 is a graph which shows a magnified view of the spectral irradiance of the Sun and the absorption coefficient of the Earth's atmosphere from 1100 nm to 1200 nm. As shown in the graph, there is a relative maximum in atmospheric absorption from about 1110 nm to about 1165 nm. These wavelengths would therefore be candidates for the operating wavelength of a lidar system according to the improved embodiments discussed herein.

Figure 7:
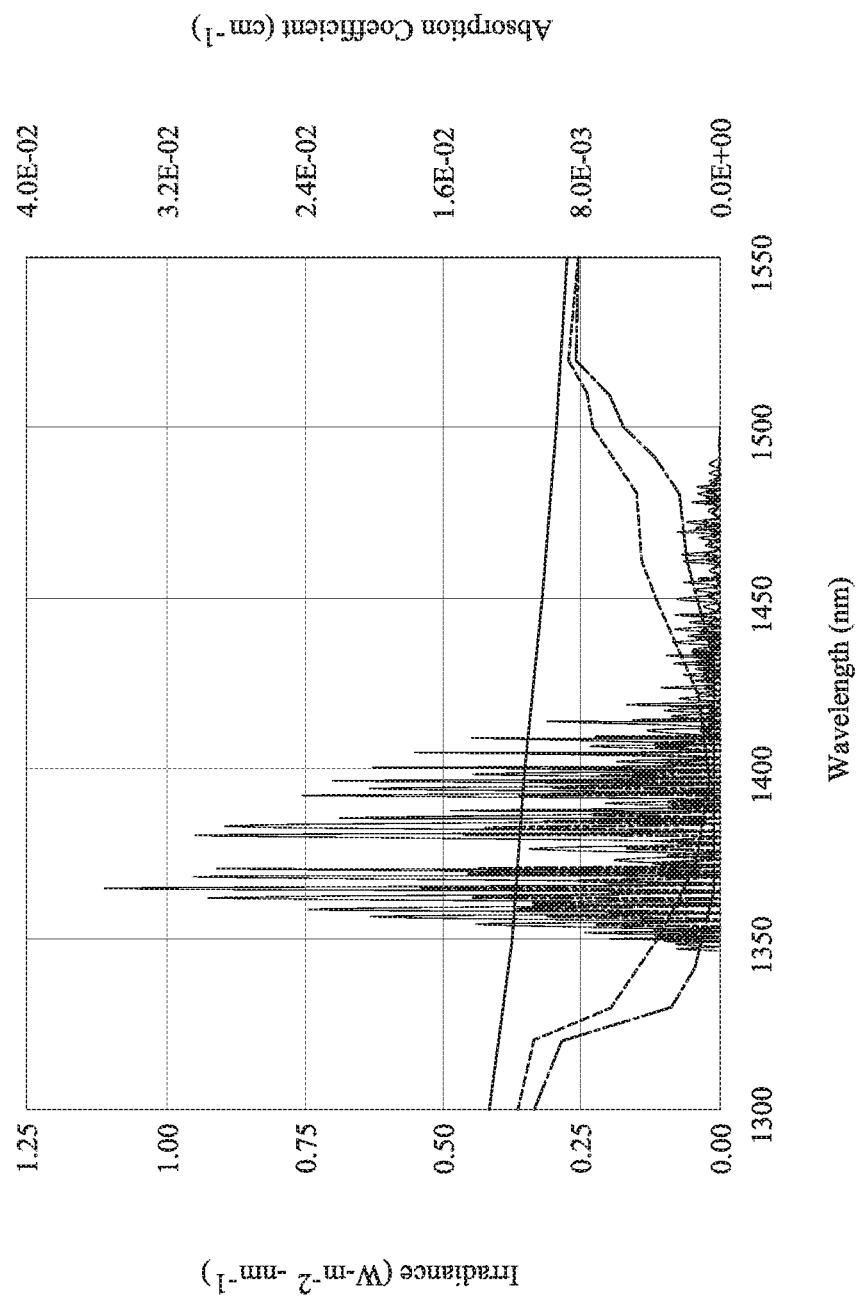
FIG. 7 is a graph which shows a magnified view of the spectral irradiance of the Sun and the absorption coefficient of the Earth's atmosphere from 1300 nm to 1550 nm.

FIG. 7 is a graph which shows a magnified view of the spectral irradiance of the Sun and the absorption coefficient of the Earth's atmosphere from 1300 nm to 1550 nm. As shown in the graph, there is a relative maximum in atmospheric absorption from about 1340 nm to about 1480 nm, and more specifically from about 1350 nm to about 1460 nm. These wavelengths would therefore be candidates for the operating wavelength of a lidar system according to the improved embodiments discussed herein.

Figure 8:
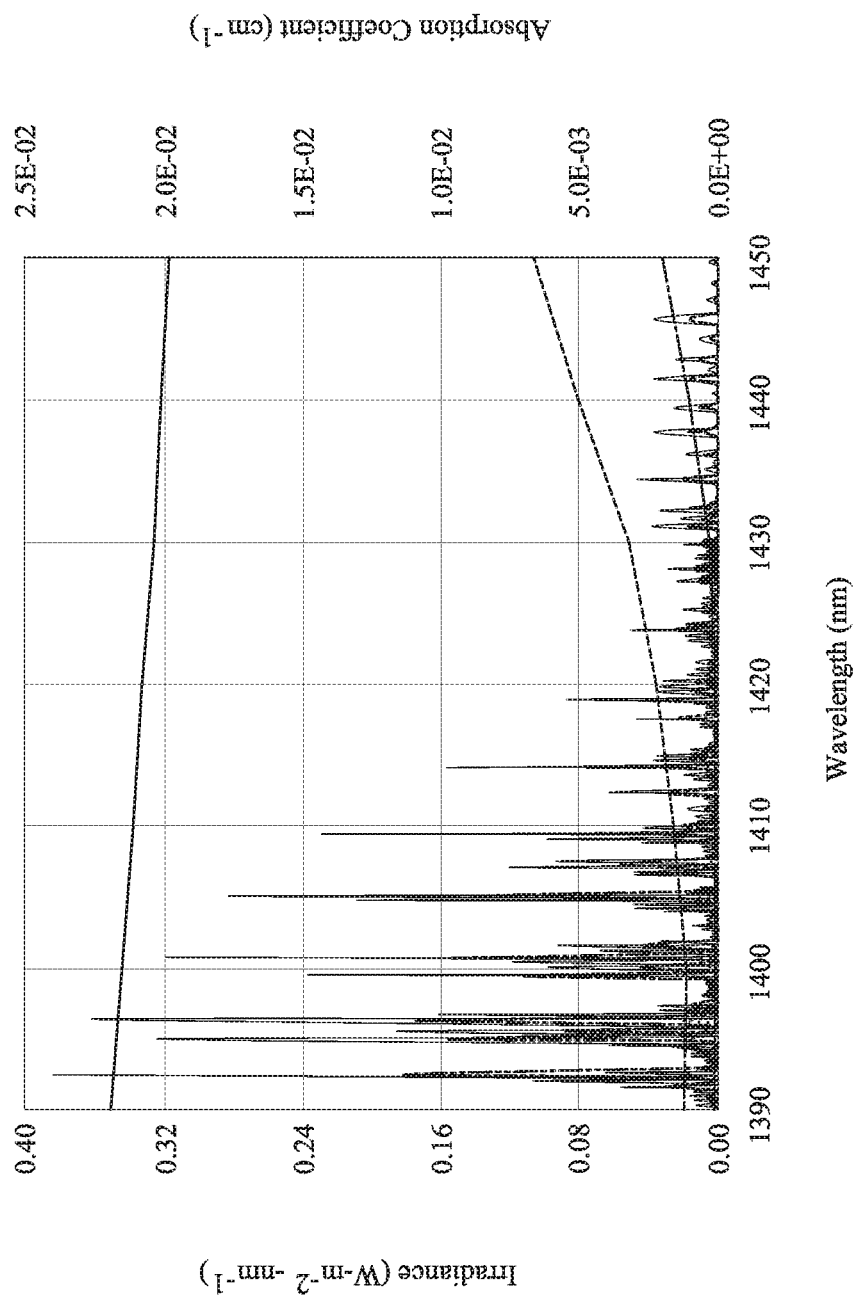
FIG. 8 is a graph which shows a magnified view of the spectral irradiance of the Sun and the absorption coefficient of the Earth's atmosphere from 1390 nm to 1450 nm.

FIG. 8 is a graph which shows a magnified view of the spectral irradiance of the Sun and the absorption coefficient of the Earth's atmosphere from 1390 nm to 1450 nm. This is a zoomed in version of a portion of the graph from FIG. 7. The graph in FIG. 8 shows that atmospheric absorption is relatively lower from about 1425 nm to about 1450 nm than from about 1390 nm to about 1420 nm. Nevertheless, atmospheric absorption is still elevated from about 1425 nm to about 1450 nm as compared to many other wavelengths. These wavelengths would therefore be candidates for the operating wavelength of a lidar system according to the improved embodiments discussed herein. This may be particularly true where less propagation path attenuation is desired for the light from the lidar system as compared to systems operating within the band from about 1360 nm to about 1420 nm where atmospheric absorption is greater.

FIG. 9 is a table which shows solar irradiance and absorption coefficients for selected wavelengths. The selected wavelengths are 905 nm, 1060 nm, 1410 nm, 1430 nm, and 1550 nm. The data are shown for both dry and humid conditions. As shown in the table, solar irradiance is less at 1410 nm and 1430 nm than at 905 nm, 1060 nm, and 1550 nm. In addition, the table shows that atmospheric absorption at 1410 nm and 1430 nm is greater than at 905 nm, 1060 nm, and 1550 nm. Thus, about 1410 nm and about 1430 nm are examples of advantageous choices for the operating wavelength of a lidar system which will experience reduced solar background noise.

FIG. 10 is a schematic illustration of an example lidar system 1000 with improved signal-to-noise ratio in the presence of solar radiation. The lidar system 1000 in FIG. 10, like the lidar system 100 in FIG. 1, includes a light source 110, beam conditioning optics 112, steering mirrors 114, 116, a receiver 126, a detector 130, and a processor 140. Each of these components can be, for example, as already described herein with respect to FIG. 1.

In some embodiments, the light source 110 emits light at eye-safe power levels. As described herein, the operating wavelength of the lidar system 1000 can advantageously be located in a band that delineates a relative maximum in atmospheric absorption. The relative maximum in atmospheric absorption can be caused by, for example, water vapor or oxygen. In some embodiments, the light source 110 emits light between about 700 nm and about 740 nm. In some embodiments, the light source 110 emits light between about 800 nm and about 840 nm. In some embodiments, the light source 110 emits light between about 930 nm and about 980 nm. In some embodiments, the light source 110 emits light between about 1080 nm and about 1175 nm. In some embodiments, the light source 110 emits light between about 1300 nm and about 1500 nm. In some embodiments, the light source 110 emits light between about 1340 nm and about 1460 nm. In some embodiments, the light source 110 emits light at about 1430 nm. In some embodiments, the light source 110 emits light between about 610 nm and about 650 nm. In some embodiments, the light source 110 emits light between about 670 nm and about 710 nm. In some embodiments, the light source 110 emits light between about 740 nm and about 780 nm. In some embodiments, the light source 110 emits light at about 760 nm. In some embodiments, the light source 110 emits light between about 1250 nm and about 1290 nm. In some embodiments, the light source 110 emits light between about 1560 nm and about 1600 nm. As discussed herein, solar background noise in these wavelength ranges will be reduced because of atmospheric absorption. In still other embodiments, the light source 110 emits ultraviolet radiation with a wavelength less than about 300 nm as the Sun does not emit light in that range.

The example lidar system 1000 in FIG. 10 additionally includes a wavelength-selective optical filter 150. The filter 150 is located before the detector 130 along the optical path within the instrument. The filter 150 could also be located at other positions upstream of the detector 130. For example, the filter 150 could be located at any position within the telescope receiver 126.

In some embodiments, the filter 150 is provided so as to absorb other wavelengths of light, besides the operating wavelength of the lidar system 1000, to which the detector 130 may be sensitive. In some embodiments, the filter 150 is a narrow band-pass filter which transmits the operating wavelength of the lidar system and attenuates other wavelengths of light. The width of the bandpass filter may be, for example, 15 nm or less, 10 nm or less, 5 nm or less, or 3 nm or less. The filter 150 can be designed so as to absorb solar radiation (e.g., from about 300 nm to about 2300 nm). The filter 150 can therefore reduce solar background noise at wavelengths other than the operating wavelength of the lidar system. In some embodiments, the filter 150 attenuates light outside of its passband by at least about 3 dB, 10 dB, 20 dB, 40 dB, 60 dB, or 80 dB.

As discussed herein, by operating within a band of relatively high atmospheric absorption, and by further including a filter 150 to attenuate other solar radiation, the lidar system 1000 can achieve improved signal-to-noise ratio. This is particularly true over relatively short operating ranges of less than 1 km, and especially less than 100 m.

In some embodiments, the detector 130 may have a noise-equivalent power (NEP) that is less than or equal to 100 photons, 50 photons, 30 photons, 20 photons, or 10 photons. As an example, the detector 130 may be a SPAD detector with a NEP of less than or equal to 20 photons. The NEP of the detector 130 is a metric that quantifies the sensitivity of the detector 130 in terms of a minimum signal (or a minimum number of photons) that the detector 130 can detect. In some embodiments, the NEP may correspond to an optical power (or to a number of photons) that results in a signal-to-noise ratio of 1, or the NEP may represent a threshold number of photons above which an optical signal may be detected. As an example, if the detector 130 has a NEP of 20 photons, then an input beam 122 with 20 photons may be detected with a signal-to-noise ratio of approximately 1 (e.g., the detector 130 may receive 20 photons from the input beam 122 and generate an electrical signal representing the input beam 122 that has a signal-to-noise ratio of approximately 1). Similarly, an input beam 122 with 100 photons may be detected with a signal-to-noise ratio of approximately 5.

In some embodiments, a lidar system (e.g., 100, 1000) may include a SPAD detector having a NEP less than or equal to 20 photons and may operate at a wavelength corresponding to a relative maximum in atmospheric absorption (e.g., operating wavelength between about 1400 nm and about 1460 nm). The SPAD detector may include an InGaAs avalanche-multiplication region configured to detect light within a range of approximately 1400-1460 nm through an avalanche-detection process. In comparison, a conventional lidar system may detect light using a PN photodiode (e.g., a photodiode structure formed by a p-type semiconductor and a n-type semiconductor) or a PIN photodiode (e.g., a photodiode structure formed by an undoped intrinsic semiconductor region located between p-type and n-type regions). A lidar system (e.g., 100, 1000) with a detector 130 having a NEP of less than or equal to 100 photons, 50 photons, 30 photons, 20 photons, or 10 photons may offer improved detection sensitivity with respect to a conventional lidar system that uses a PN or PIN photodiode. As an example, an InGaAs PIN photodiode used in a conventional lidar system may have a NEP of approximately $10^4$ or $10^5$ photons, and the noise level in a lidar system with an InGaAs PIN photodiode may be $10^3$ or $10^4$ times greater than the noise level in a lidar system with an InGaAs SPAD detector.

In some embodiments, the light source 110 may be configured to switch between emitting light at an elevated-absorption operating wavelength and emitting light at a different wavelength that has a reduced absorption relative to the elevated-absorption operating wavelength. As an example, the elevated-absorption wavelength may lie within a band that delineates a relative maximum in atmospheric absorption, and the reduced-absorption wavelength may correspond to an atmospheric absorption value that is less than the relative maximum in atmospheric absorption. The atmospheric absorption value at the reduced-absorption wavelength may be less than or equal to 0.5, 0.25, $10^{-1}$, $10^{-2}$, $10^{-3}$, or $10^{-4}$ of the atmospheric absorption at the elevated-absorption wavelength. As an example, the atmospheric absorption coefficient at the elevated-absorption wavelength may be between $10^{-3}$ cm$^{-1}$ and $10^{-4}$ cm$^{-1}$, and the reduced-absorption coefficient may be less than or equal to approximately $5\times10^{-5}$ cm$^{-1}$.

In some embodiments, the elevated-absorption wavelength of the light source 110 may be between about 1360 nm and about 1430 nm, and the reduced-absorption wavelength may be between about 1430 nm and about 1550 nm. As an example, the light source 110 may be configured to operate at approximately 1430 nm (for a relative maximum absorption) and approximately 1550 nm (for a reduced absorption). In some embodiments, the elevated-absorption wavelength of the light source 110 may be between about 930 nm and about 955 nm, and the reduced-absorption wavelength may be between about 900 nm and about 930 nm or between about 955 nm and about 1000 nm. In some embodiments, the elevated-absorption wavelength of the light source 110 may be between about 1110 nm and about 1165 nm, and the reduced-absorption wavelength may be between about 1165 nm and about 1200 nm. The elevated-absorption and reduced-absorption wavelengths may include any suitable combination of wavelengths. As an example, the elevated-absorption wavelength may include any suitable wavelength in the range 930-955 nm, 1110-1165 nm, or 1360-1430 nm, and the reduced-absorption wavelength may include any suitable wavelength in the range 900-930 nm, 955-1000 nm, 1165-1200 nm, or 1430-1550 nm.

In some embodiments, the light source 110 may have an adjustable or tunable wavelength. As an example, light source 110 may be configured to produce light at two or more particular wavelengths (e.g., 1430 nm and 1550 nm). In some embodiments, switching between emitting light at an elevated-absorption operating wavelength and emitting light at a reduced-absorption wavelength may include switching between a first seed laser configured to produce the elevated-absorption operating wavelength and a second seed laser configured to produce the reduced-absorption wavelength. The light source 110 may include two or more seed lasers operating at different wavelengths and an optical combiner or an optical switch that feeds into an optical amplifier. For example, the light source 110 may include a 1430-nm diode laser (corresponding to the elevated-absorption wavelength) and a 1550-nm diode laser (corresponding to the reduced-absorption wavelength) connected to a 2×1 optical combiner. By powering on either the 1430-nm diode laser or the 1550-nm diode laser, the output wavelength of the light source 110 can be switched between 1430 nm and 1550 nm.

In some embodiments, switching between emitting light at an elevated-absorption operating wavelength and emitting light at a reduced-absorption wavelength may include tuning the wavelength of a seed laser between the elevated-absorption operating wavelength and the reduced-absorption wavelength. As an example, light source 110 may be continuously tunable over a particular wavelength range (e.g., the light source 110 may be configured to produce light at any wavelength from approximately 1425 nm to approximately 1430 nm). The light source 110 may include a diode laser with a wavelength that can be continuously tuned by changing the temperature of the diode laser. As an example, a temperature-tuned diode laser may be configured to switch between operating at approximately 1430 nm or approximately 1432 nm based on the temperature setting of the diode laser. As another example, a diode laser may be configured to continuously tune the wavelength over the range 1430-1432 nm by adjusting the diode-laser temperature setting.

In some embodiments, the light source 110 may be configured to dynamically tune the operating wavelength to adjust or optimize the associated absorption. In some embodiments, the light source 110 may be configured to emit light at an elevated-absorption wavelength, and if a particular condition is met indicating a decrease in received signal quality, then the light source 110 may be switched to emit light at a reduced-absorption wavelength. As an example, if an amplitude of a signal produced by the detector 130 in response to detecting scattered light (e.g., input beam 122) falls below a predetermined threshold value, then the processor 140 may be configured to instruct the light source 110 to switch to emitting light at a reduced-absorption wavelength. As another example, if a signal-to-noise ratio of a signal produced by the detector 130 in response to detecting scattered light falls below a predetermined threshold value, then the processor 140 may be configured to instruct the light source 110 to switch to emitting light at a reduced-absorption wavelength. As another example, if an amount of rain, fog, or moisture in the environment where the lidar system 100 is operating rises above a predetermined threshold amount (e.g., as indicated by a rain sensor or a humidity sensor), then the processor 140 may be configured to instruct the light source 110 to switch to emitting light at a reduced-absorption wavelength. As another example, if a measure of signal quality (e.g., signal amplitude or signal-to-noise ratio) from detector 130 decreases below a particular threshold value, then the wavelength of the light source 110 may be adjusted until the signal quality improves to above the threshold value. The wavelength of the light source 110 may be adjusted by switching the wavelength to one or more different wavelengths, or the wavelength of the light source 110 may be adjusted in a continuous fashion (e.g., by temperature tuning a diode laser of light source 110) until the signal quality improves.

A lidar system (e.g., 100, 1000) as described herein may offer an improved performance relative to conventional lidar systems that operate at wavelengths away from a relative maximum in atmospheric absorption. Conventional lidar systems may be designed to expressly avoid operating at wavelengths having elevated atmospheric absorption to reduce the amount of optical absorption experienced by the light source. However, such conventional lidar systems which operate at wavelengths having reduced atmospheric absorption may experience increased levels of solar background noise. Although the light source of a conventional lidar system may experience reduced transmission loss due to atmospheric absorption, the overall signal-to-noise ratio of a conventional lidar system may be degraded due to the presence of solar background noise caused by the reduced absorption of light from the sun at the lidar system's operating wavelength. Conversely, although a lidar system (e.g., 100, 1000) as described herein may experience higher levels of transmission loss due to atmospheric absorption, the significant reduction in solar background noise associated with the selected operating wavelength may result in a system within an overall improvement in signal-to-noise ratio.

A lidar system (e.g., 100, 1000) as described or illustrated herein may also include various elements described or illustrated in U.S. Provisional Patent Application No. 62/251,672, filed Nov. 5, 2015 and entitled "Lidar System with Improved Scanning Speed for High-Resolution Depth Mapping" or U.S. Provisional Patent Application No. 62/261,214, filed Nov. 30, 2015 and entitled "Lidar System with a Distributed Laser and a Plurality of Sensor Heads," each of which is incorporated herein by reference in its entirety.

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps may be altered, added, removed, or rearranged. While certain embodiments have been explicitly described, other embodiments will become apparent to those of ordinary skill in the art based on this disclosure.

The systems and methods described herein can advantageously be implemented using, for example, computer software, hardware, firmware, or any combination of software, hardware, and firmware. Software modules can comprise computer executable code for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers. In addition, where methods are described that are, or could be, at least in part carried out by computer software, it should be understood that such methods can be provided on computer-readable media (e.g., optical disks such as CDs or DVDs, hard disk drives, flash memories, diskettes, or the like) that, when read by a computer or other processing device, cause it to carry out the method.

While certain embodiments have been explicitly described, other embodiments will become apparent to those of ordinary skill in the art based on this disclosure. Therefore, the scope of the invention is intended to be defined by reference to the claims and not simply with regard to the explicitly described embodiments.

What is claimed is:

1. A lidar system comprising:
   a light source configured to:
      emit light toward a target, the light source having an operating wavelength which lies within a band that delineates a relative maximum in atmospheric absorption; and
      switch between emitting light at the operating wavelength and emitting light at a wavelength that has a reduced atmospheric absorption, comprising switching between a first seed laser that produces the operating wavelength and a second seed laser that produces the reduced-absorption wavelength, wherein switching between the first seed laser and the second seed laser comprises powering on either the first seed laser or the second seed laser;
   a detector configured to detect scattered light that is emitted by the light source and subsequently scattered from the target; and a processor configured to:
determine a characteristic of the target based on a characteristic of the scattered light received at the detector;
determine that a measure of signal quality of a signal produced by the detector in response to detecting the scattered light falls below a predetermined threshold value; and
in response to the measure of signal quality falling below the threshold value, instruct the light source to switch from emitting light at the operating wavelength to emitting light at the reduced-absorption wavelength.

2. The lidar system of claim 1, further comprising a wavelength-selective filter located in front of the detector, wherein the wavelength-selective filter substantially transmits light at the operating wavelength of the light source and at the reduced-absorption wavelength and attenuates light at surrounding wavelengths.

3. The lidar system of claim 2, wherein the wavelength-selective filter substantially attenuates solar wavelengths, except for the operating wavelength of the light source and the reduced-absorption wavelength, to which the detector is sensitive.

4. The lidar system of claim 3, wherein the wavelength-selective filter attenuates solar wavelengths, except for the operating wavelength of the light source and the reduced-absorption wavelength, to which the detector is sensitive by at least about 3 dB.

5. The lidar system of claim 2, wherein the wavelength-selective filter substantially attenuates wavelengths, except for the operating wavelength of the light source and the reduced-absorption wavelength, to which the detector is sensitive between about 300 nm and about 2300 nm.

6. The lidar system of claim 2, wherein the wavelength-selective filter comprises an interference filter.

7. The lidar system of claim 1, wherein the operating wavelength of the light source lies within a water absorption band of the atmosphere.

8. The lidar system of claim 1, wherein the operating wavelength of the light source is between about 930 nm and about 980 nm.

9. The lidar system of claim 1, wherein the operating wavelength of the light source is between about 1110 nm and about 1165 nm.

10. The lidar system of claim 1, wherein the operating wavelength of the light source is between about 1400 nm and about 1460 nm.

11. The lidar system of claim 10, wherein the operating wavelength of the light source is about 1430 nm.

12. The lidar system of claim 1, wherein the operating wavelength of the light source lies within an oxygen absorption band of the atmosphere.

13. The lidar system of claim 1, wherein the atmospheric absorption coefficient at the operating wavelength is at least about 0.0001 $cm^{-1}$.

14. The lidar system of claim 13, wherein the atmospheric absorption coefficient at the operating wavelength is at least about 0.001 $cm^{-1}$.

15. The lidar system of claim 14, wherein the atmospheric absorption coefficient at the operating wavelength is at least about 0.01 $cm^{-1}$.

16. The lidar system of claim 1, wherein a maximum operating range of the system is 1 km or less.

17. The lidar system of claim 16, wherein the maximum operating range of the system is 100 m or less.

18. The lidar system of claim 1, wherein the detector comprises a single-photon avalanche diode (SPAD) detector.

19. The lidar system of claim 1, wherein the system measures time of flight or phase modulation of the light scattered from the target.

20. The lidar system of claim 1, wherein the system is eye-safe.

21. The lidar system of claim 1, wherein the reduced-absorption wavelength corresponds to an atmospheric absorption value that is less than or equal to one-half of the relative maximum in atmospheric absorption.

22. The lidar system of claim 1, wherein:
the relative maximum in atmospheric absorption is greater than or equal to $10^{-4}$ $cm^{-1}$; and
the reduced atmospheric absorption is less than or equal to $10^{-5}$ $cm^{-1}$.

23. The lidar system of claim 1, wherein:
the operating wavelength of the light source is between about 1360 nm and about 1430 nm; and
the reduced-absorption wavelength is between about 1430 nm and about 1550 nm.

24. The lidar system of claim 1, wherein the measure of signal quality comprises an amplitude of the signal produced by the detector in response to detecting the scattered light.

25. The lidar system of claim 1, wherein the measure of signal quality comprises a signal-to-noise ratio of the signal produced by the detector in response to detecting the scattered light.

26. The lidar system of claim 1, wherein the processor is further configured to:
determine that an amount of rain, fog, or moisture where the lidar system is operating rises above a predetermined threshold amount; and
in response to the amount of rain, fog, or moisture rising above the threshold amount, instruct the light source to switch from emitting light at the operating wavelength to emitting light at the reduced-absorption wavelength.

27. The lidar system of claim 1, further comprising a microelectromechanical systems (MEMS) scanning device to scan the emitted light along a scan path.

28. A method comprising:
by a light source of a lidar system, emitting light toward a target, wherein the light source has an operating wavelength which lies within a band that delineates a relative maximum in atmospheric absorption;
by the light source, switching between emitting light at the operating wavelength and emitting light at a wavelength that has a reduced atmospheric absorption, comprising switching between a first seed laser that produces the operating wavelength and a second seed laser that produces the reduced-absorption wavelength, wherein switching between the first seed laser and the second seed laser comprises powering on either the first seed laser or the second seed laser;
by a detector of the lidar system, detecting scattered light that is emitted by the light source and subsequently scattered from the target; and
by a processor of the lidar system, determining a characteristic of the target based on a characteristic of the scattered light received at the detector; and
by the processor:
determining that a measure of signal quality of a signal produced by the detector in response to detecting the scattered light falls below a predetermined threshold value; and
in response to the measure of signal quality falling below the threshold value, instructing the light source to switch from emitting light at the operating wavelength to emitting light at the reduced-absorption wavelength.

* * * * *